United States Patent
Hirata et al.

(10) Patent No.: US 9,908,657 B2
(45) Date of Patent: Mar. 6, 2018

(54) LABEL ATTACHING APPARATUS

(71) Applicant: ISHIDA CO., LTD., Kyoto-shi, Kyoto (JP)

(72) Inventors: Kosuke Hirata, Ritto (JP); Tomoyuki Kazuno, Ritto (JP); Kyohei Otsu, Ritto (JP); Nobuyuki Uhara, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 15/425,278

(22) Filed: Feb. 6, 2017

(65) Prior Publication Data

US 2017/0225819 A1    Aug. 10, 2017

(30) Foreign Application Priority Data

Feb. 9, 2016   (JP) ................................ 2016-022805

(51) Int. Cl.
  *B65C 9/42*   (2006.01)
  *G05B 15/02*  (2006.01)
  *B65C 9/26*   (2006.01)
  *B65C 9/18*   (2006.01)
  *B65C 3/06*   (2006.01)

(52) U.S. Cl.
  CPC ............... *B65C 9/42* (2013.01); *B65C 3/06* (2013.01); *B65C 9/18* (2013.01); *B65C 9/26* (2013.01); *G05B 15/02* (2013.01)

(58) Field of Classification Search
  CPC .... B65C 9/08; B65C 9/18; B65C 9/40; B65C 9/42; B65C 9/46; B65C 2009/402; B65C 2009/404; B65C 2210/0094; G01V 8/12
  USPC ........................................................ 156/367
  See application file for complete search history.

(56) References Cited

U.S. PATENT DOCUMENTS 3,985,605 A   10/1976  Treiber et al.
4,615,757 A   10/1986  Treiber

FOREIGN PATENT DOCUMENTS

EP    1571092 A1    9/2005
JP    2004-323114 A 11/2004

OTHER PUBLICATIONS

Extended European Search Report of the corresponding European Patent Application No. 17154942.1, dated Jun. 1, 2017.

*Primary Examiner* — George Koch
(74) *Attorney, Agent, or Firm* — Global IP Counselors, LLP

(57) ABSTRACT

A package pricing apparatus includes a plurality of label issuing mechanisms, a plurality of label attaching mechanisms for attaching a plurality of labels to a commodity, an acquisition part for acquiring commodity information about the commodity, and a control part for controlling operations of the plurality of label attaching mechanisms. On the basis of the commodity information, the control part switches to a first mode in which all of the labels to be attached to the commodity are attached to the commodity by the plurality of label attaching mechanisms or a second mode in which some of the labels to be attached to the commodity are attached to the commodity by one of the label attaching mechanisms and the remaining labels are carried to a given position by the other label attaching mechanism.

6 Claims, 8 Drawing Sheets

LABEL ATTACHING APPARATUS

TECHNICAL FIELD

The present invention relates to a label attaching apparatus.

BACKGROUND

For example, an apparatus described in Japanese Unexamined Patent Publication No. 2004-323114 is known as a conventional label attaching apparatus. The label attaching apparatus described in Japanese Unexamined Patent Publication No. 2004-323114 is provided with a plurality of label feeding mechanisms for feeding labels, a plurality of label attaching mechanisms for attaching the plurality of labels fed from the plurality of label feeding mechanisms to individual packaged commodities carried to given label attachment positions, and a plurality of transverse displacing mechanisms for two-dimensionally displacing the plurality of individual label attaching mechanisms with respect to carrying planes of the packaged commodities.

In a configuration provided with the plurality of label attaching mechanisms like the conventional label attaching apparatus, the plurality of labels can be attached to the commodities at the same timing. In this configuration, when sizes of the commodities are small, the label attachment positions on the commodities are closer. For this reason, when the labels are attached, the plurality of label attaching mechanisms have a risk of coming within a certain distance of each other. For this reason, in the conventional label attaching apparatus, when the plurality of label attaching mechanisms approach to each other, an error occurs and the apparatus is stopped. When the apparatus is stopped because of the error, work such as collection of the commodities is needed. For this reason, restarting of the stopped apparatus takes time, and work efficiency is decreased An aspect of the present invention is intended to provide a label attaching apparatus capable of preventing deterioration of work efficiency when labels are attached to commodities using a plurality of label attaching mechanisms.

SUMMARY

A label attaching apparatus according to an aspect of the present invention is a label attaching apparatus for attaching labels to a commodity, and includes: a plurality of label issuing mechanisms configured to issue the labels; a plurality of label attaching mechanisms configured to attach to the commodity the plurality of labels issued from the plurality of label issuing mechanisms; an acquisition part configured to acquire commodity information about the commodity; and a control part configured to control operations of the plurality of label attaching mechanisms. On the basis of the commodity information acquired by the acquisition part, the control part switches to a first mode in which all of the labels to be attached to the commodity are attached to the commodity by the plurality of label attaching mechanisms or a second mode in which some of the labels to be attached to the commodity are attached to the commodity by one of the label attaching mechanisms and the remaining labels are carried to a given position by the other label attaching mechanism.

In the label attaching apparatus according to the aspect of the present invention, the operations of the label attaching mechanisms are switched to the first mode or the second mode on the basis of the commodity information. Thereby, in the label attaching apparatus, for example when a size of the commodity is small and attachment positions of the labels at the commodity are positions at which the plurality of label attaching mechanisms can approach to each other, the control part switches the operations of the plurality of label attaching mechanisms to the second mode. In the second mode, some of the labels are attached to the commodity by one of the label attaching mechanisms, and the remaining labels are carried to the given position by the other label attaching mechanism. The label ejection position is set to, for example, a position at which the label attaching mechanisms do not approach to each other and the position the operator's hand can reach. Thereby, the remaining labels may be manually attached to the commodity by the operator. For this reason, the plurality of labels may be attached to the commodity, and occurrence of an error due to the plurality of label attaching mechanisms approaching to each other may be avoided. In this way, in the label attaching apparatus, work of attaching the labels can be continued without stopping the apparatus. Therefore, in the label attaching apparatus, deterioration of work efficiency may be prevented.

In an embodiment, the label attaching apparatus may include an announcement part configured to announce the switching to the second mode when the switching to the second mode is performed at the control part. Thereby, the announcement part may announce the switching to the second mode to the operator. For this reason, since the operator can know that the operation is the second mode, the operator can change the work of attaching the labels to the work of manually attaching the labels to the commodity In the embodiment, the control part may determine, on the basis of the commodity information, whether or not the plurality of label attaching mechanisms come within a given distance from each other, and switch to the second mode when the plurality of label attaching mechanisms come within the given distance from each other. Thereby, since the plurality of label attaching mechanisms are prevented from approaching to each other, stopping of the apparatus caused by an error maybe reliably avoided.

In the embodiment, the label attaching apparatus may include an input part configured to receive input for designating the commodity, and a storage part configured to store the commodity information including a size of the commodity, and attachment positions of the plurality of labels on the commodity. The acquisition part may acquire the size and the attachment positions of the commodity from the storage part on the basis of the commodity input to the input part, and the control part may switch to the first mode or the second mode on the basis of the size and the attachment positions of the commodity acquired by the acquisition part. In this configuration, since the size and the attachment positions of the commodity are acquired from the storage part on the basis of the commodity input at the input part, the switching to the first mode or the second mode maybe appropriately performed.

In the embodiment, the label attaching apparatus may include a detection part configured to detect a size of the commodity. The acquisition part may acquire the size of the commodity from a detected result of the detection part, acquire sizes of the labels issued from the plurality of label issuing mechanisms, and set attachment positions of the plurality of labels in the commodity on the basis of the size of the commodity and the sizes of the labels, and the control part may switch to the first mode or the second mode on the basis of the attachment positions set by the acquisition part and the size of the commodity. In this configuration, since the size of the commodity is acquired from the detected result of the detection part, the switching to the first mode or the second mode maybe performed even when the size of the commodity is not previously set. Since the attachment positions of the plurality of labels are set by acquiring the sizes of the plurality of labels, even when the commodity has different sizes of labels, the switching to the first mode or the second mode may be appropriately performed.

In the embodiment, the detection part may capture an image of the commodity, and the acquisition part may acquire the size of the commodity on the basis of the image captured by the detection part. In this configuration, the size of the commodity may be accurately acquired.

In the embodiment, the commodity may be a tray and an article placed on the tray, and the label attaching apparatus may include packaging units for packaging the tray and the articles. In this configuration, since the processes from the packaging of the commodity to the attachment of the labels to the commodity may be performed, the work efficiency is improved.

According to the aspect of the present invention, deterioration of work efficiency when the labels are attached to the commodity using the plurality of label attaching mechanisms may be prevented.

DETAILED DESCRIPTION

Hereinafter, a preferred embodiment of the present invention will be described in detail with reference to the attached drawings. Note that, in the description of the drawings, the same or equivalent elements are given the same signs, and duplicate description thereof will be omitted.

A package pricing apparatus (a label attaching apparatus) 1 is an apparatus that issues a commodity label 110 on which information about a commodity G is printed. In the package pricing apparatus 1 of the present embodiment, further, the commodity G of contents (an article) placed on a tray T of a perishable foodstuff or the like or the commodity G of vegetables and fruits or the like not placed on a tray T is pushed against a film F held in a stretched state, and a peripheral portion of the film F is folded toward a bottom side of the tray T. Thereby, film packaging is performed.

The package pricing apparatus 1 performs film packaging on the contents placed on the tray T, and attaches the commodity label 110 (see FIG. 7A) and a promotion label 120 (see FIG. 7B) to the film-packaged commodity G.

Figure 1:
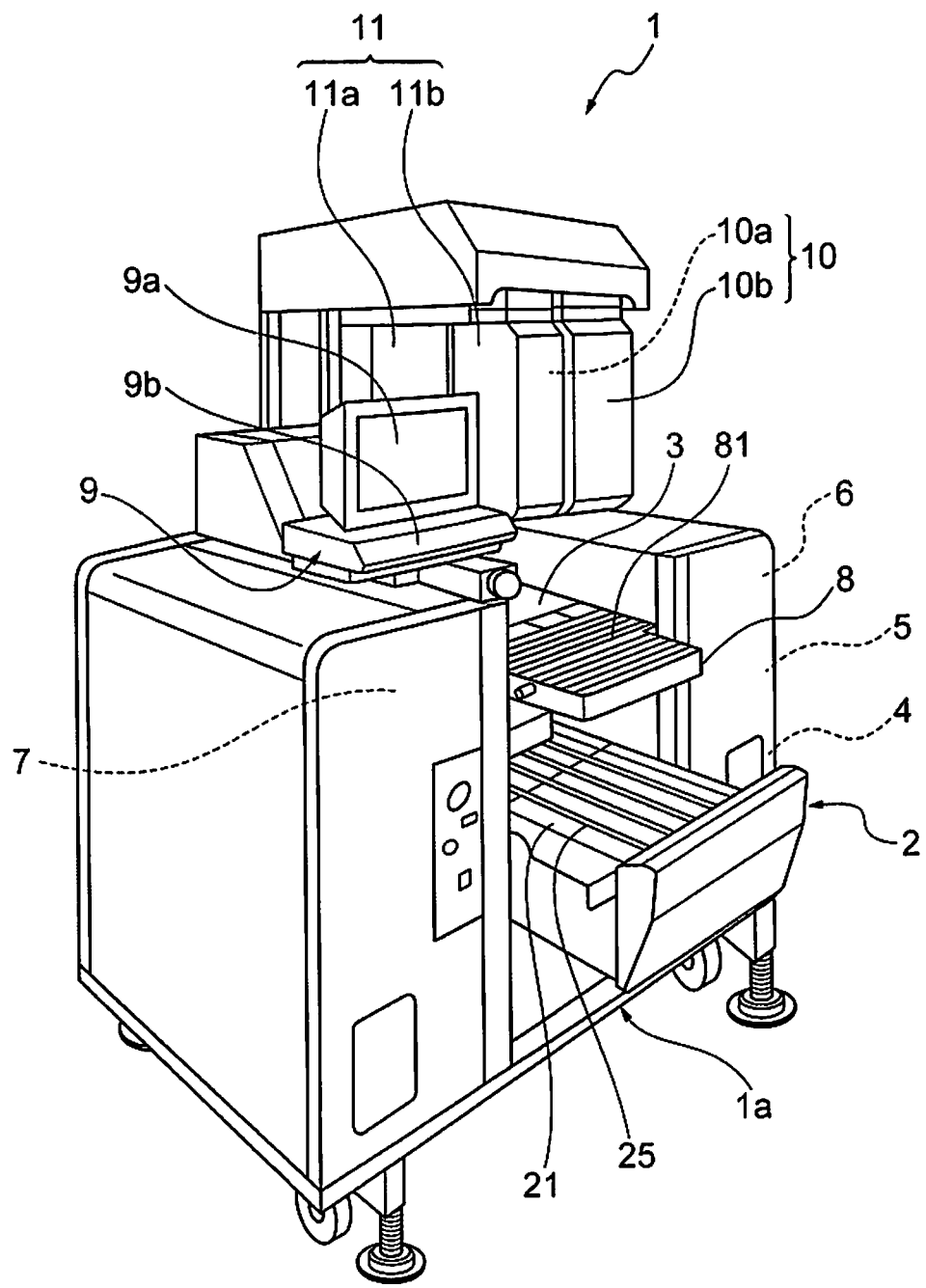
FIG. 1 is an external perspective view illustrating a package pricing apparatus of an embodiment.
Figure 2:
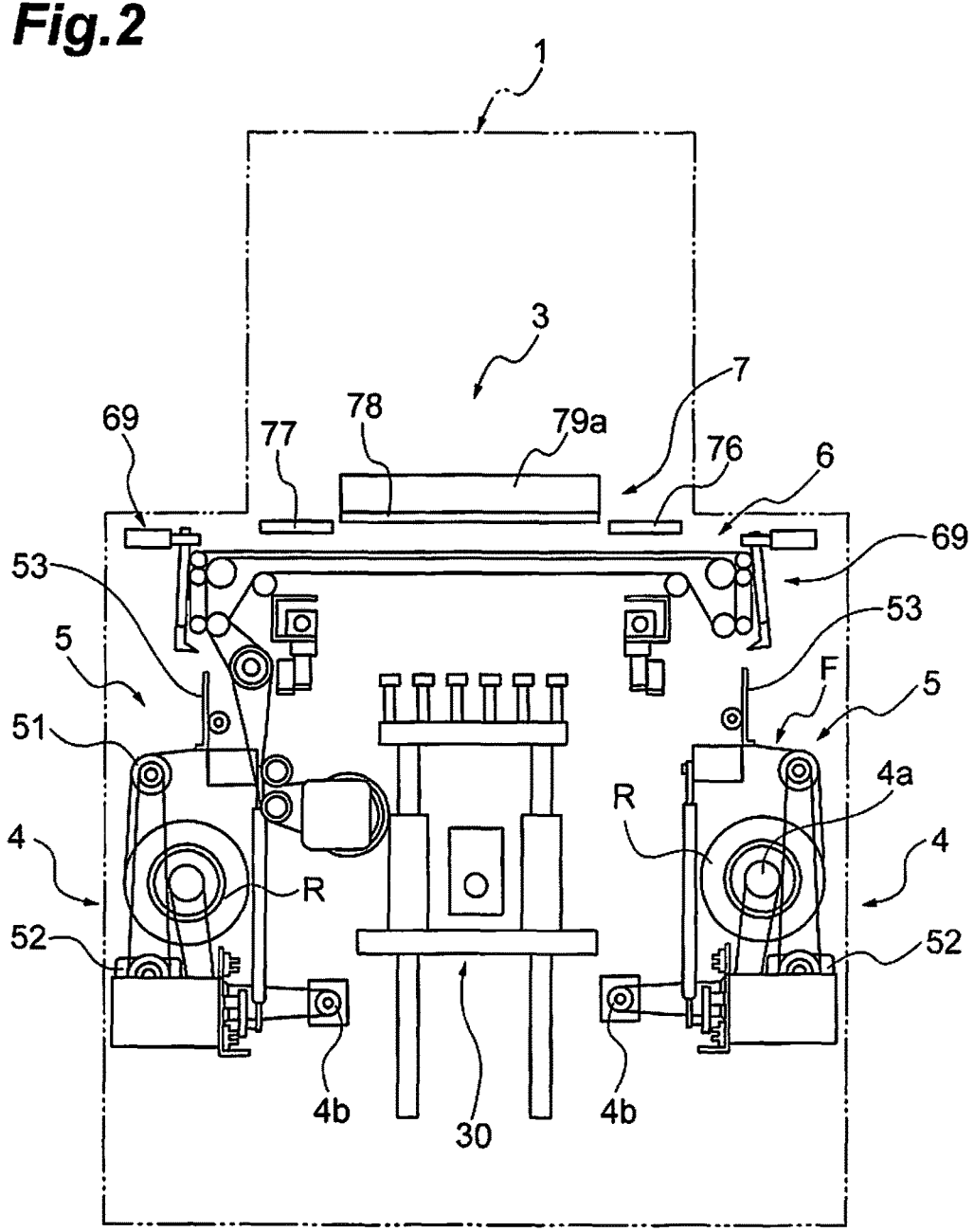
FIG. 2 is a schematic front view illustrating an internal configuration of the package pricing apparatus of FIG. 1.

As illustrated in FIGS. 1 and 2, the package pricing apparatus 1 is provided with a weighing and carrying-in mechanism 2, roll supporting mechanisms (packaging units) 4, film discharging mechanisms (packaging units) 5, a film carrying mechanism (a packaging unit) 6, a folding mechanism (a packaging unit) 7, a sealing mechanism (a packaging unit) 8, a first pricing unit (a label issuing mechanism and a label attaching mechanism) 10, a second pricing unit (a label issuing mechanism and a label attaching mechanism) 11, and a control unit 9.

The weighing and carrying-in mechanism 2 is provided at a front middle portion of a main body 1a. The roll supporting mechanisms 4 are arranged at opposite lateral portions of the main body 1a, and hold film rolls R. The film discharging mechanisms 5 discharge the films F pulled out of the film rolls R upward. The film carrying mechanism 6 receives the film F from each of the film discharging mechanisms 5, and carries the film F to a package station 3 which is a space formed inside the main body 1a.

The folding mechanism 7 packages an article to be packaged using the film F carried to the package station 3. The sealing mechanism 8 thermally seals the film F that is folded toward a bottom side of the article to be packaged by the folding mechanism 7. The first pricing unit 10 issues the commodity label 110 (see FIG. 7A) on which information (a weight, a price, etc.) about the commodity G is printed, and attaches the commodity label 110 to the commodity G. The second pricing unit 11 issues the promotion label 120 (see FIG. 7B) on which an advertising message about the commodity G is printed, and attaches the promotion label 120 to the commodity G. The promotion label is also one form of a commodity label on which information about the commodity is printed.

Figure 3:
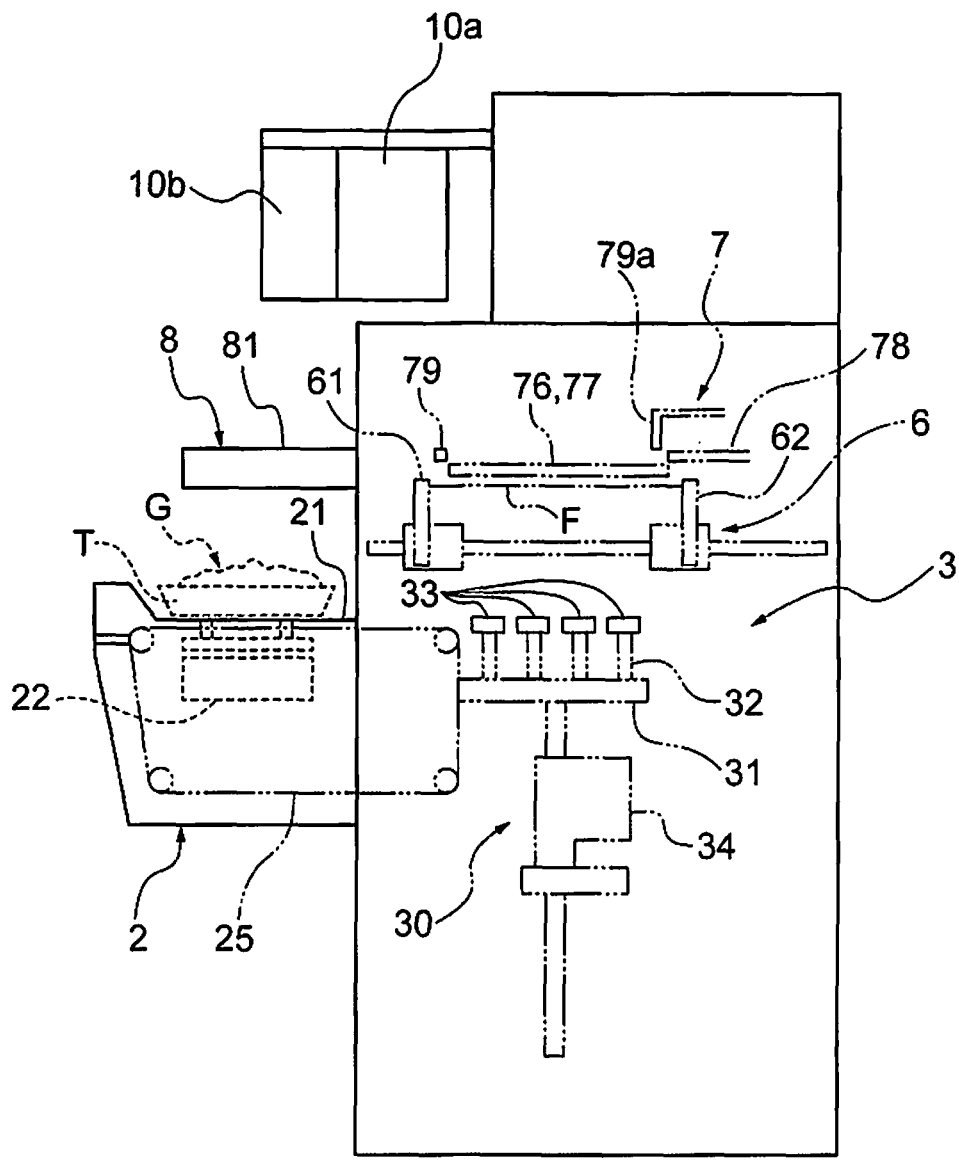
FIG. 3 is a schematic side view illustrating the internal configuration of the package pricing apparatus of FIG. 1.

As illustrated in FIG. 3, the weighing and carrying-in mechanism 2 has a measuring table 21 and a meter main body 22 that measure a weight of the commodity G such as a foodstuff stored in the tray T, a plurality of carrying-in conveyors 25 that are provided between four pulleys in a tensioned state, and a motor (not shown) that moves the carrying-in conveyors 25. When the tray T is placed on the measuring table 21, the weight of the commodity G is measured by the meter main body 22. Then, the tray T is carried by the carrying-in conveyors 25, and is sent onto support members 33 of a lifter mechanism 30 of the package station 3 (inside the device).

Figure 4:
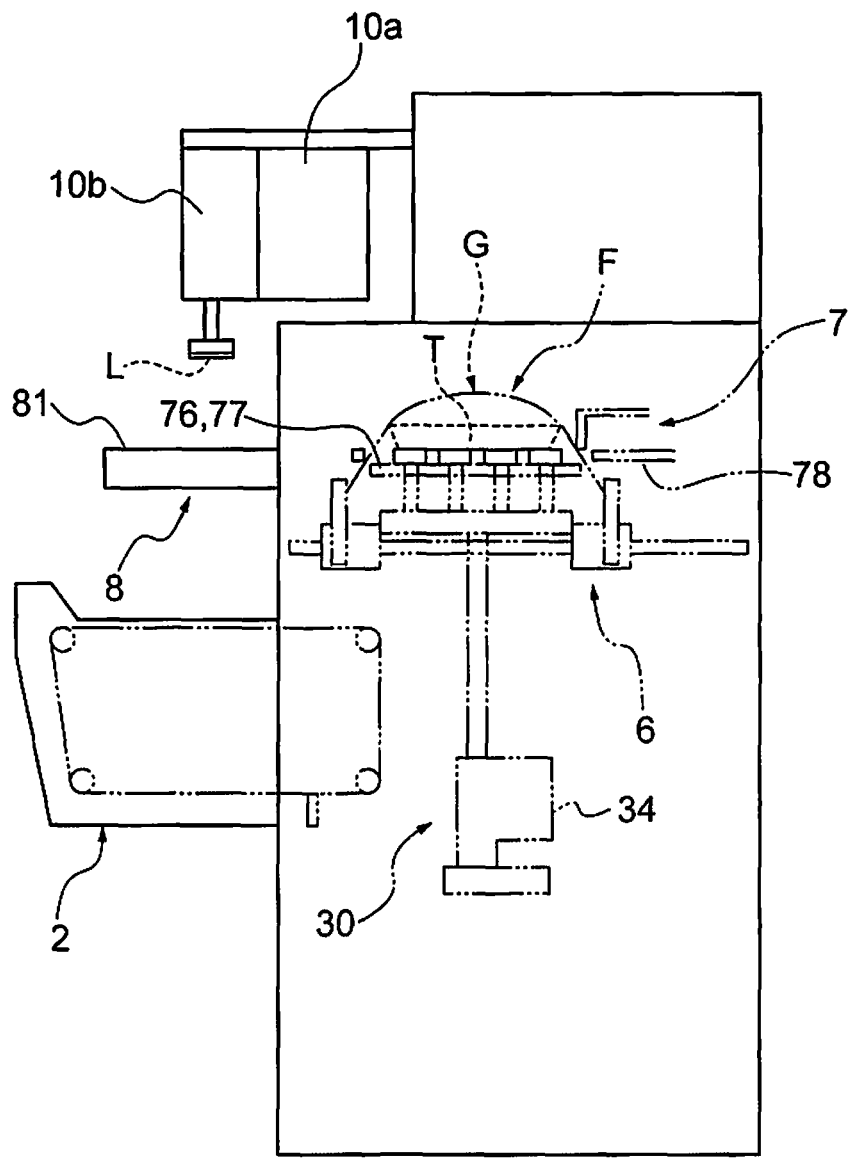
FIG. 4 is a schematic side view illustrating the internal configuration of the package pricing apparatus of FIG. 1.

The package station 3 is a space that is inside the main body 1a and performs a series of film packaging processes on the measured commodity G and the tray T. In the package station 3, the film F is tensioned by the film carrying mechanism 6, and the lifter mechanism 30 pushes the tray T and the commodity G up with respect to the film F as illustrated in FIG. 4. The folding mechanism 7 folds the peripheral portion of the film F toward the bottom side of the tray T with the film F pushed up. Thereby, the tray T and the commodity G are covered by the film F.

As illustrated in FIG. 3, the lifter mechanism 30 for holding a bottom of the tray T and displacing the tray T and the commodity G upward is provided below the package station 3. The lifter mechanism 30 has a support base 31, a plurality of support bars 32 that are fixed on the support base 31, and the support members 33 that are rotatably supported by upper ends of the support bars 32 and receive the bottom of the tray T. The lifter mechanism 30 has an electromotive ball screw mechanism 34 that vertically displaces the support base 31.

Each of the support bars 32 has a hinge that bends from front to back and from side to side at a middle portion thereof, and temporarily falls down when a left folding plate 76, a right folding plate 77, and a rear folding plate 78, which will be described below, enter a lower portion of the tray 1'.

As illustrated in FIG. 2, the roll supporting mechanisms 4 for supporting the film rolls R are nearly symmetrically provided at opposite lateral portions of the main body 1a. The roll supporting mechanisms 4 mainly have roll bars 4a and driving motors 4b. The roll bars 4a are inserted into the film rolls R, and hold the film rolls R using holders or the like. The roll bars 4a are driven according to rotation of the driving motors 4b.

The film discharging mechanisms 5 are mechanisms for delivering the films F pulled from the film rolls R to a pair of feeder units (first and second feeder units 61 and 62) of the film carrying mechanism 6 (to be described below). The film discharging mechanisms 5 mainly have unreeling rollers 51 and film inserting plate units 53. The unreeling rollers 51 are turned by operation of the unreeling motors 52. The film inserting plate units 53 hold the films F using a pair of plate members and one-way rollers, and are vertically displaced to thereby deliver the films F to the film carrying mechanism 6.

The film carrying mechanism 6 receives the films F that are unreeled from the film rolls R by the film discharging mechanisms 5, carries the films F to a middle portion of the package station 3, and further keeps the films F in a tensioned state. As illustrated in FIGS. 3 and 4, the film carrying mechanism 6 mainly has the first feeder unit 61 and the second feeder unit 62.

The first feeder unit 61 is disposed at a front side when viewed from the front of the package pricing apparatus 1, and the second feeder unit 62 is disposed at a rear side when viewed from the front of the package pricing apparatus 1. The first feeder unit 61 and the second feeder unit 62 clamp the opposite lateral portions (lateral portions of the front and rear sides) of the laterally carried film F with upper and lower belts, and carry the films F through belt driving. The first and second feeder units 61 and 62 can move in a width direction of the films (in a leftward/rightward direction of FIGS. 3 and 4).

As illustrated in FIG. 2, cutter mechanisms 69 are disposed at a front side of the film carrying mechanism 6 in a film carrying direction. After the films F delivered from the film discharging mechanisms 5 to the film carrying mechanism 6 are carried a given amount by the film carrying mechanism 6, the cutter mechanisms 69 are provided to cut the film F between the film discharging mechanism 5 and the film carrying mechanism 6 and the film F between the film discharging mechanism 5 and the film carrying mechanism 6. Each of the cutter mechanisms 69 has a cutting blade longer than a width of the film. The cutter mechanisms 69 cut the films F using the cutting blades displaced by actuators.

As illustrated in FIGS. 2 and 4, the folding mechanism 7 mainly has the left folding plate 76, the right folding plate 77, the rear folding plate 78, and a front folding rod 79. The left folding plate 76 and the right folding plate 77 fold opposite ends of the films F in the film carrying direction to the bottom side of the tray T. The left folding plate 76 and the right folding plate 77 are provided to be horizontally movable by a motor and a timing belt (which are not shown).

Since the rear folding plate 78 folds lateral portions of the films F, which are at the second feeder unit 62 side, toward the bottom side of the tray T, the rear folding plate 78 can be horizontally moved by a motor and a timing belt (which are not shown). The front folding rod 79 is disposed such that lateral portions of the films F, which are at the first feeder unit 61 side, are folded toward the bottom side of the tray T when the tray T is discharged by a discharge pusher 79a pushing the tray T toward the sealing mechanism 8 side.

As illustrated in FIGS. 3 and 4, the sealing mechanism 8 heats and seals the bottom of the tray T pushed out by the discharge pusher 79a, and a front portion thereof also has a function of a table receiving the discharged commodity G. As illustrated in FIG. 1, a discharge table 81 in which a heater is installed is disposed on a surface side (an upper side) of the sealing mechanism 8.

Figure 5:
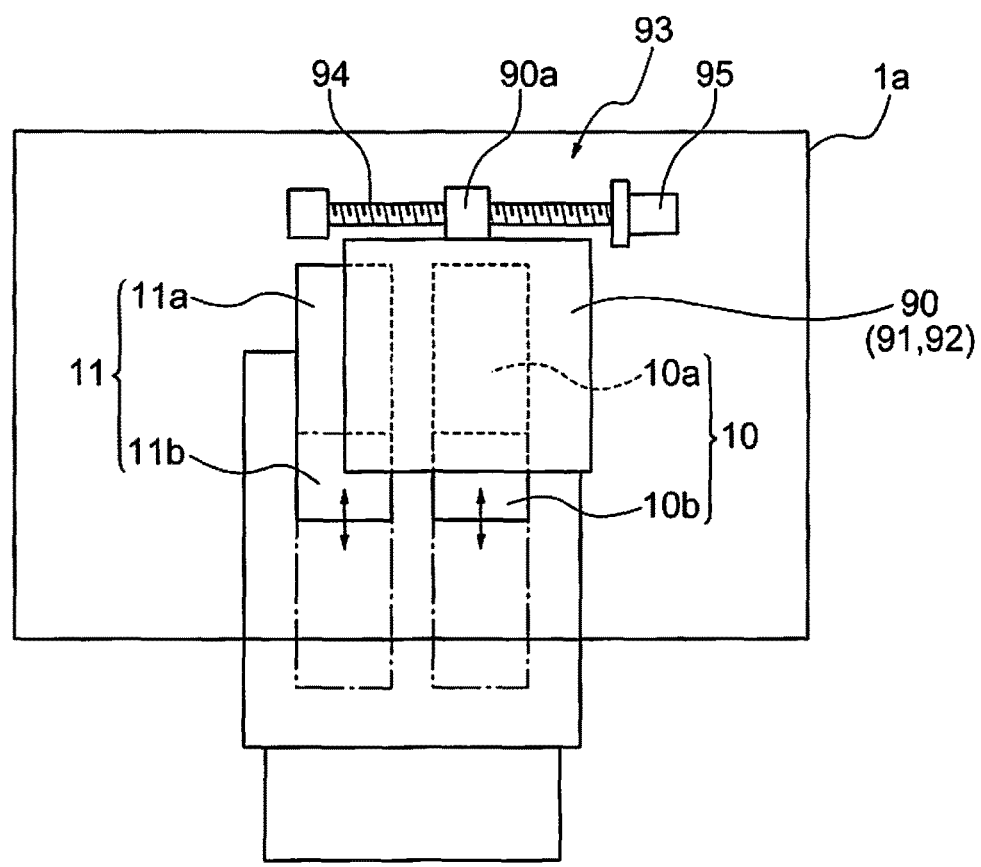
FIG. 5 is a top view illustrating internal configurations of first and second pricing units of FIG. 1.
Figure 7A:
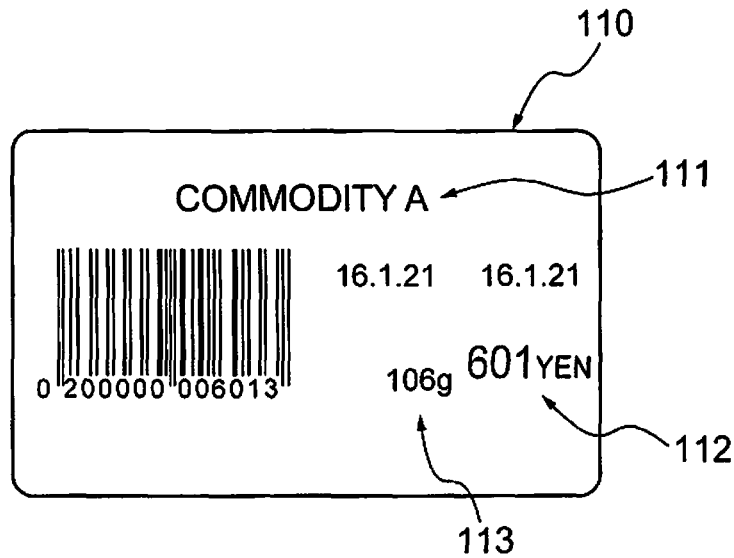
FIG. 7A is a diagram illustrating an example of a commodity label.

The first pricing unit 10 and the second pricing unit 11 are disposed above the folding mechanism 7 and the sealing mechanism 8, and are arranged in parallel in a leftward/rightward direction when viewed from the front of the package pricing apparatus 1. As illustrated in FIGS. 1 and 5, the first pricing unit 10 has a first label printer (a label issuing mechanism) 10a and a first attaching unit (a label attaching mechanism) 10b. The first label printer 10a and the first attaching unit 10b are formed integrally. In the present embodiment, the first label printer 10a issues the commodity label 110 (see FIG. 7A) on which the information (the weight, the price, etc.) about the commodity G is printed. The first attaching unit 10b is provided to be movable between the first label printer 10a and the commodity G to which the commodity label 110 is attached, and attaches the commodity label 110 received from the first label printer 10a to the commodity G. As illustrated in FIG. 7A, for example, a name 111 of the commodity, a price 112 of the commodity, and a volume 113 of the contents are indicated on the commodity label 110 of the present embodiment.

Figure 7B:
FIG. 7B is a diagram illustrating an example of a promotion label.

The second pricing unit 11 has a second label printer (a label issuing mechanism) 11a and a second attaching unit (a label attaching mechanism) 11b. The second label printer 11a and the second attaching unit 11b are formed integrally. In the present embodiment, the second label printer 11a issues the promotion label 120 (see FIG. 7B) on which the advertising message about the commodity G is printed. The second attaching unit 11b is provided to be movable between the second label printer 11a and the commodity G to which the promotion label 120 is attached, and attaches the promotion label 120 received from the second label printer 11a to the commodity G. As illustrated in FIG. 7B, for example, a promotion message 121 is indicated on the promotion label 120 of the present embodiment.

Upper ends of the first and second pricing units 10 and 11 are partly mounted to be movable relative to a base member 90 provided at an upper end of the main body 1a. To be specific, the first pricing unit 10 and the second pricing unit 11 are respectively provided to be movable in a forward/backward direction by a first moving mechanism 91 and a second moving mechanism 92 provided for the base member 90, and assume label attachment positions (solid line positions of FIG. 5) at which a label is attached to the tray T and label ejection positions (dot-and-dash line positions of FIG. 5) at which they move to the front side of the device.

The base member 90 on which the first pricing unit 10 and the second pricing unit 11 are mounted is provided to be movable within a given range in a leftward/rightward direction by a transverse moving mechanism 93. The transverse moving mechanism 93 has a ball screw 94 extending in a leftward/rightward direction and a motor 95 for rotating and driving the ball screw 94. The ball screw 94 is rotatably supported by the main body 1a, and a nut member 90a fixed to the base member 90 is screwed onto this ball screw 94. With this configuration, the first pricing unit 10 and the second pricing unit 11 are synchronized, are movable in a leftward/rightward direction, and are movable in a forward/backward direction independently of each other.

Figure 6:
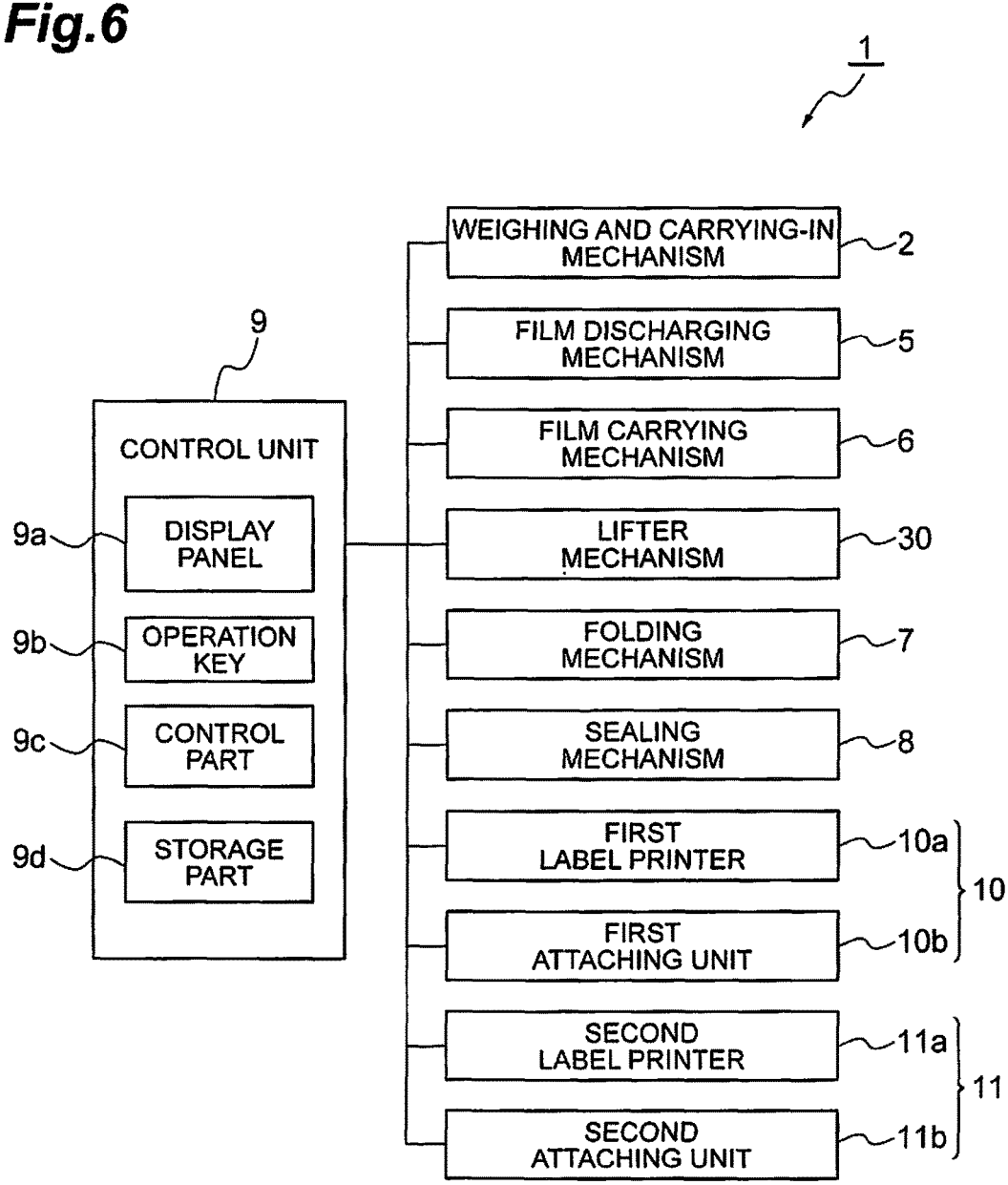
FIG. 6 is a block diagram illustrating a functional configuration of the package pricing apparatus of FIG. 1.

As illustrated in FIG. 6, the control unit 9 has a display panel (an announcement part) 9a, operation keys (an input part) 9b, a control part (an acquisition part) 9c, and a storage part 9d. The display panel 9a, the operation keys 9b, the control part 9c, and the storage part 9d are disposed at an upper portion of the main body 1a. The control unit 9 controls operations of the mechanisms (the weighing and carrying-in mechanism 2, the package station 3, the roll supporting mechanisms 4, the film discharging mechanisms 5, the film carrying mechanism 6, the folding mechanism 7, the sealing mechanism 8, the first pricing unit 10, and the second pricing unit 11). The control part 9c has an input/output interface that performs input/output of a signal, or the like on the outside, a read only memory (ROM) in which a program and information for performing processes are stored, a random access memory (RAM) in which data is temporarily stored, a storage medium such as a hard disk drive (HDD), a central processing unit (CPU), and a communication circuit. On the basis of a signal which the CPU outputs, the control part 9c stores input data in the RAM, loads the program stored in the ROM to the RAM, and performs the program loaded to the RAM, thereby performing various processes.

The control part 9c performs calculation or the like of the prices of the commodity G on the basis of the weight of the commodity (or the contents) G which is measured by the weighing and carrying-in mechanism 2, and controls the first label printer 10a to issue the commodity label 110 on which the weight, the price, etc. of the commodity G are printed. Along with this, the control part 9c controls the first attaching unit 10b to attach the commodity label 110 to the commodity G. In addition, the control part 9c controls the second label printer 11a to issue the promotion label 120 on which the promotion message according to a promotion content set via the operation keys 9b or the like is printed. Along with this, the control part 9c controls the second attaching unit 11b to attach the promotion label 120 to the commodity G.

On the basis of the commodity information about the commodity G, the control part 9c switches the operation mode of the first and second attaching units 10b and 11b to a first mode or a second mode. The first mode is an automatic attachment mode in which the commodity label 110 and the promotion label 120 (all of the labels) are automatically attached by the first attaching unit 10b and the second attaching unit 11b. The second mode is a manual attachment mode in which some of the labels are attached by manual work of an operator.

The commodity information includes a size of the commodity G (a size of the tray T), and attachment positions of the commodity label 110 and the promotion label 120 at the commodity G. The commodity information is stored in the storage part 9d. To be specific, the commodity G, the size of the commodity G, and the attachment positions of the commodity label 110 and the promotion label 120 at the commodity G are stored in the storage part 9d in association with one another. The commodity information is input with the operation keys 9b by an operator, and thereby is stored in the storage part 9d. To be more specific, the operator operates the operation keys 9b, opens a setting screen for setting the commodity information at the display panel 9a, and sets the size of the commodity G (the size of the tray T) and the attachment positions of the commodity label 110 and the promotion label 120 at the commodity G on the setting screen.

In the present embodiment, the control part 9c acquires the size and the attachment positions of the commodity G from the storage part 9d on the basis of the information designating the commodity input with the operation keys 9b, and switches the operation mode to either the first mode in which all of the labels 110 and 120 to be attached to the commodity G are attached to the commodity G by the first attaching unit 10b and the second attaching unit 11b or the second mode in which the commodity label 110 of the commodity and the promotion labels 110 and 120 to be attached to the commodity G is attached to the commodity G by the first attaching unit 10b and the promotion label 120 is carried to a label ejection position (a given position) by the second attaching unit 11b. The label ejection position is a position that the operator's hand can reach.

To be specific, when the commodity label 110 and the promotion label 120 are attached to the commodity G at the same timing, the control part 9c determines, on the basis of the size and the attachment positions of the commodity G, whether or not the first attaching unit 10b and the second attaching unit 11b come within a given distance from each other. When the first attaching unit 10b and the second attaching unit 11b come within the given distance from each other, the control part 9c switches the operation mode to the second mode. In other words, when the commodity label 110 and the promotion label 120 are attached to the commodity G at the same timing, and when the first attaching unit 10b and the second attaching unit 11b are separated further than the given interval, the control part 9c switches the operation mode to the first mode. The given interval is an interval at which the first attaching unit 10b and the second attaching unit 11b come into contact, for example, if the commodity label 110 and the promotion label 120 are attached to the commodity G at the same timing.

In the case of the first mode, the control part 9c controls the first label printer 10a and the second label printer 11a to issue the commodity label 110 and the promotion label 120, and controls the first attaching unit 10b and the second attaching unit 11b to attach the commodity label 110 and the promotion label 120 to the commodity G at the same timing.

In the case of the second mode, the control part 9c controls the first label printer 10a and the second label printer 11a to issue the commodity label 110 and the promotion label 120, controls the first attaching unit 10b to attach the commodity label 110 to the commodity G, and controls the second attaching unit 11b to carry the promotion label 120 to the label ejection position (the dot-and-dash line position of FIG. 5). After it is detected by a sensor (not shown) that the label 120 is detached from the second attaching unit 11b, the control part 9c displaces the second attaching unit 11b to a standby position.

When the operation mode is switched to the second mode in the control part 9c, the display panel 9a announces that the operation mode is switched to the second mode. To be specific, when the operation mode is switched to the second mode, the display panel 9a displays, for example, "second mode" on a button by which the first mode and the second mode are manually switched. The display panel 9a displays, for example, "second mode" in the above button in a color which an operator easily recognizes (red or the like). An announcing method of the display panel 9a may adopt various methods (for example, pop-up display or the like).

Figure 8:
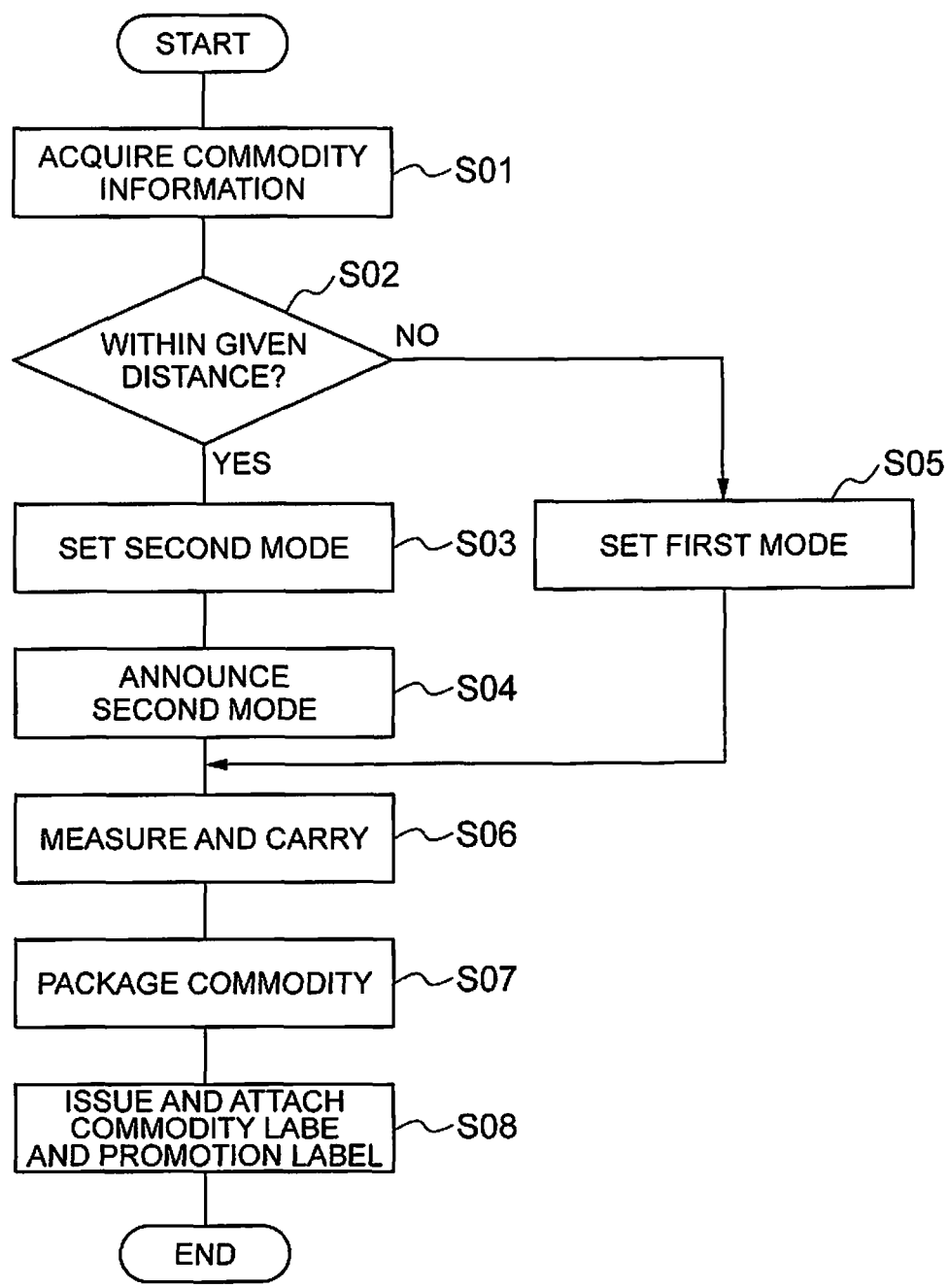
FIG. 8 is a flow chart illustrating an operation of the package pricing apparatus of the embodiment.

Next, a pricing process of the package pricing apparatus 1 will be described with reference to FIG. 8. First, an operator operates the operation keys 9b to designate the commodity G. As illustrated in FIG. 8, when the commodity G is designated by the operator, the control part 9c acquires a size and attachment positions (commodity information) of the commodity G from the storage part 9d (step S01).

Next, on the basis of the size and the attachment positions of the commodity G, the control part 9c determines whether or not the first attaching unit 10b and the second attaching unit 11b come within a given distance from each other (step S02). When it is determined that the first and second attaching units 10b and 11 b come within the given distance from each other, the control part 9c sets the operation mode to the second mode (step S03). When the control part 9c sets the operation mode to the second mode, the display panel 9a announces that the operation mode is set to the second mode (switched to the second mode) (step S04). On the other hand, when it is not determined that the first and second attaching units 10b and 11b come within the given distance from each other (when it is determined that the first and second attaching units 10b and 11 b fall outside of the given distance from each other), the control part 9c sets the operation mode to the first mode (step S05).

Next, when the operator places the tray T (hereinafter referred to as an unpackaged article) in which the commodity G is placed on the measuring table 21 of the weighing and carrying-in mechanism 2, the control part 9c waits for measurement to be completed by stabilizing a measured value, and operates the carrying-in conveyors 25. Thereby, as illustrated in FIGS. 3 and 4, the unpackaged article is pushed onto the support members 33 of the lifter mechanism 30 (step S06).

The films F delivered from the film rolls R to the film carrying mechanism 6 by the film discharging mechanisms 5 are cut by the cutter mechanisms 69. One of the rectangular films F cut by the cutter mechanisms 69 is transferred above the lifter mechanism 30 by the first feeder unit 61 and the second feeder unit 62. Opposite lateral portions of the film F are strongly held above the lifter mechanism 30 by operations of clamps provided for the first feeder unit 61 and the second feeder unit 62.

The lifter mechanism 30 controlled by the control part 9c pushes the unpackaged article up with respect to the film F that is strongly held in this way. Thereby, the strongly held film F is stretched to cover an upper portion of the unpackaged article. In this state, when the control part 9c horizontally displaces the rear folding plate 78, the left folding plate 76, and the right folding plate 77 to the bottom side of the tray T, the holding of the film F is released in the clamps of the first feeder unit 61 and the second feeder unit 62, and three peripheral sides of the film F are folded toward the lower side of the tray T. The discharge pusher 79a controlled by the control part 9c pushes the tray T toward the sealing mechanism 8 side. Thereby, one side of the film F which is not folded and is at a front side hits the front folding rod 79, and is folded toward the lower side of the tray T with movement of the tray T toward the sealing mechanism 8 side. Once the film F folded toward the lower side of the tray T is thermally sealed in the course of this movement and is discharged to the discharge table 81, it is in a packaged state in which the commodity G is covered with the film F (step S07).

Next, the control part 9c performs issuing and attaching of the commodity label 110 and the promotion label 120 (step S08). The control part 9c controls the first label printer 10a, and prints various pieces of information based on measurement on a label unreeled from a label roll. The printed commodity label 110 is peeled from a mount, and is sent to the first attaching unit 10b side. The control part 9c controls the second label printer 11a, and prints an advertising (promotion) message on a label unreeled from a label roll. The printed promotion label 120 is peeled from a mount, and is sent to the second attaching unit 11b side.

When the operation mode is set to the second mode in step S03, the control part 9c controls the first attaching unit 10b and the second attaching unit 11b to attach the commodity label 110 and the promotion label 120 issued from the first label printer 10a and the second label printer 11a to the commodity G at the same timing. When the operation mode is set to the first mode in step S04, the control part 9c controls the first attaching unit 10b to attach the commodity label 110 issued from the first label printer 10a to the commodity G, and controls the second attaching unit 11b to carry the promotion label 120 issued from the second label printer 11a to the label ejection position. The promotion label 120 carried to an exchangeable position is detached from the second attaching unit 11b by an operator, and is attached to the commodity G by manual work of the worker.

As described above, in the package pricing apparatus 1 according to the present embodiment, the operations of the first attaching unit 10b and the second attaching unit 11b are switched to the first mode or the second mode on the basis of the commodity information. Thereby, in the package pricing apparatus 1, for example when the size of the commodity G is small and the attachment positions of the commodity label 110 and the promotion label 120 at the commodity G are positions at which the first attaching unit 10b and the second attaching unit 11b can approach to each other, the control part 9c switches the operation of the first attaching unit 10b and the second attaching unit 11b to the second mode. In the second mode, the commodity label 110 is attached to the commodity G by the first attaching unit 10b, and the promotion label 120 is carried to the label ejection position by the second attaching unit 11b. The label ejection position is a position at which the first attaching unit 10b and the second attaching unit 11b do not approach to each other and the position the operator's hand can reach. Then, the promotion label is manually attached to the commodity G by the operator. For this reason, the commodity label 110 and the promotion label 120 can be attached to the commodity G, and occurrence of an error due to the first attaching unit 10b and the second attaching unit 11b approaching to each other may be avoided. In this way, in the package pricing apparatus 1, work of attaching the commodity label 110 and the promotion label 120 can be continued without stopping the apparatus. Therefore, in the package pricing apparatus 1, deterioration of work work efficiency may be prevented.

The package pricing apparatus 1 according to the present embodiment is provided with the display panel 9a announcing that the operation mode is switched to the second mode when the operation mode is switched to the second mode at the control part 9c. Thereby, the display panel 9a can announce the switched second mode to the operator. For this reason, since the operator can know that the operation mode is the second mode, the operator can change the work of attaching the label to the work of manually attaching the label to the commodity.

In the package pricing apparatus 1 according to the present embodiment, the control part 9c determines, on the basis of the commodity information, whether or not the first attaching unit 10b and the second attaching unit 11b come within a given distance from each other, and switches the operation mode to the second mode when the first attaching unit 10b and the second attaching unit 11b come within the given distance from each other. Thereby, since the first attaching unit 10b and the second attaching unit 11b are prevented from approaching to each other, stopping of the apparatus caused by an error can be reliably avoided.

The operation keys 9b that receive input for designating the commodity G, and the storage part 9d that stores the commodity information including the commodity G, the size of the commodity G, and the attachment positions of the commodity label 110 and the promotion label 120 on the commodity G are provided in the package pricing apparatus 1 according to the present embodiment. The control part 9c acquires the size and attachment positions of the commodity G from the storage part 9d on the basis of the commodity G input with the operation keys 9b, and switches to the first mode or the second mode on the basis of the size and attachment positions of the commodity G. In this configuration, since the size and attachment positions of the commodity G are acquired from the storage part 9d on the basis of the commodity G input in the operation keys 9b, it is possible to adequately switch to the first mode or the second mode.

An embodiment of the present invention has been described above, but the present invention is not limited to the above embodiment.

<Modification 1>

In the above embodiment, the mode in which the commodity information is set by the operation of the operation keys 9b in the display panel 9a and is stored in the storage part 9d has been described as an example. However, the commodity information may be acquired from a host device (not shown) via communication.

<Modification 2>

In the above embodiment, the mode in which the control part 9c acquires the size of the commodity and the attachment positions of the commodity label 110 and the promotion label 120 on the commodity G from the storage part 9d has been described as an example. However, the size of the commodity may be acquired from a result detected by a CCD camera (a detection part). The CCD camera is disposed, for example, on the reverse side of the sealing mechanism 8. The CCD camera measures dimensions of the commodity G (the tray T) placed on the measuring table 21. The CCD camera captures an image of the commodity G, and sends image data of the commodity G to the control part 9c. The control part 9c acquires the size of the commodity G (horizontal and vertical dimensions of the tray T) on the basis of the image data.

The control part 9c acquires sizes of the commodity label 110 and the promotion label 120 that are issued from the first label printer 10a and the second label printer 11a. The control part 9c sets the attachment positions of the commodity label 110 and the promotion label 120 in the commodity G on the basis of the size of the commodity G and the sizes of the commodity label 110 and the promotion label 120. To be specific, the control part 9c sets the attachment positions such that the commodity label 110 and the promotion label 120 are attached a given interval, for example, inside a periphery of the rectangular tray T. Layouts of the commodity label 110 and the promotion label 120 which are attached are previously set.

The control part 9c switches to the first mode or the second mode on the basis of the size and the attachment positions of the commodity G. The control part 9c determines, on the basis of the size and the attachment positions of the commodity G, whether or not the first attaching unit 10b and the second attaching unit 11b come within a given distance from each other when the commodity label 110 and the promotion label 120 are attached to the commodity G at the same timing, and switches to the second mode when the first attaching unit 10b and the second attaching unit 11b come within the given distance from each other.

In the above configuration, since the size of the commodity G is acquired by the CCD camera, the switching of the first mode and the second mode can be performed even if the size of the commodity G is not preset. In addition, since the sizes of the commodity label 110 and the promotion label 120 are acquired and the attachment positions of the commodity label 110 and the promotion label 120 are set, even if the labels of the commodities G have different sizes (in the case of a mountless label), it is possible to adequately switch to the first mode or the second mode.

The detection part for detecting the size of the commodity G is not limited to the CCD camera. The detection part may be, for example, an optical sensor or the like.

<Modification 3>

In the above embodiment, the mode in which the first label printer 10a issues the commodity label 110 and the second label printer 11a issues the promotion label 120 has been described as an example. However, the first label printer 10a may issue the promotion label 120, and the second label printer 11a may issue the commodity label 110. The first label printer 10a and the second label printer 11a may issue labels of different types or labels of the same types.

<Modification 4>

In the above embodiment, the mode in which, in the second mode, the control part 9c controls the first attaching unit 10b to attach the commodity label 110 to the commodity G and controls the second attaching unit 11b to carry the promotion label 120 to the label ejection position has been described as an example. However, in the second mode, the control part 9c may control the second attaching unit 11b to attach the promotion label 120 to the commodity G, and control the first attaching unit 10b to carry the commodity label 110 to the label ejection position. In this case, the promotion label 120 is automatically attached by the second attaching unit 11b, and the commodity label 110 is manually attached by an operator.

<Other Modifications>

In the above embodiment, the mode in which the two label printers, i.e. the first label printer 10a and the second label printer 11a, are provided has been described as an example. However, three or more label printers may be provided. In this case, for example, two label printers for issuing the commodity label and one label printer for issuing the promotion label may be provided. The label printers for issuing the commodity label may issue commodity labels whose sizes are different from each other.

In the above embodiment, the mode in which the contents placed on the tray T are film-packaged and the commodity label 110 and the promotion label 120 are attached to the film-packaged commodity G has been described as an example. However, the packaging units (the roll supporting mechanisms 4, the film discharging mechanisms 5, the film carrying mechanism 6, the folding mechanism 7, and the sealing mechanism 8) may not be provided. In this case, the label attaching apparatus attaches a label to a commodity G that is not placed on the tray T.

In the above embodiment, the mode in which, when the operation mode is switched to the second mode at the control part 9c, the switching to the second mode is announced by the display panel 9a has been described as an example. However, the announcement part may be another means or use another method. For example, the switching to the second mode may be announced by a buzzer, turning on or off a lamp, and so on.

What is claimed is:

1. A label attaching apparatus for attaching labels to a commodity, the label attaching apparatus comprising:
   a plurality of label issuing mechanisms configured to issue the labels;
   a plurality of label attaching mechanisms configured to attach the plurality of labels issued from the plurality of label issuing mechanisms to the commodity, the plurality of label attaching mechanisms including a first label attaching mechanism and a second label attaching mechanism;
   an acquisition part configured to acquire commodity information about the commodity;
   a control part configured to control operations of the plurality of label attaching mechanisms, such that the first label attaching mechanism and the second label attaching mechanism are movable in a leftward/rightward direction, and are movable in a forward/backward direction perpendicular to the leftward/rightward direction independently of one another other, and on the basis of the commodity information acquired by the acquisition part, the control part switches to a first mode in which all of the labels to be attached to the commodity are attached to the commodity by the both the first and second label attaching mechanisms or a second mode in which some of the labels to be attached to the commodity are attached to the commodity by only one of the first and second label attaching mechanisms and the remaining labels are carried to a given position by the other of the first and second label attaching mechanism; and
   an announcement part configured to announce the switching to the second mode when the switching to the second mode is performed at the control part.

2. The label attaching apparatus according to claim 1, wherein the control part determines, on the basis of the commodity information, whether or not the first label attaching mechanism and the second label attaching mechanism come within a given distance from each other, and switches to the second mode when the the first label attaching mechanism and the second label attaching mechanism come within the given distance from each other.

3. The label attaching apparatus according to claim 1, comprising:
   an input part configured to receive input for designating the commodity; and
   a storage part configured to store the commodity information including the commodity, a size of the commodity, and attachment positions of the plurality of labels on the commodity,
   wherein the acquisition part acquires the size and the attachment positions of the commodity from the storage part on the basis of the commodity input to the input part, and
   the control part switches to the first mode or the second mode on the basis of the size and the attachment positions of the commodity acquired by the acquisition part.

4. The label attaching apparatus according to claim 1, comprising a detection part configured to detect a size of the commodity,
   wherein the acquisition part acquires the size of the commodity from a detected result of the detection part, acquires sizes of the labels issued from the plurality of label issuing mechanisms, and sets attachment positions of the plurality of labels on the commodity on the basis of the size of the commodity and the sizes of the labels, and
   the control part switches to the first mode or the second mode on the basis of the attachment positions set by the acquisition part and the size of the commodity.

5. The label attaching apparatus according to claim 4, wherein:
   the detection part captures an image of the commodity; and
   the acquisition part acquires the size of the commodity on the basis of the image captured by the detection part.

6. The label attaching apparatus according to claim 1, wherein:
   the commodity is a tray and an article placed on the tray; and
   the label attaching apparatus includes packaging units for packaging the tray and the articles.

* * * * *